United States Patent
Nambiar et al.

(10) Patent No.: US 10,304,035 B2
(45) Date of Patent: May 28, 2019

(54) DOCUMENT MANAGEMENT SYSTEM

(75) Inventors: Shibhu Nambiar, Annandale, VA (US); Suman Guha, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 278 days.

(21) Appl. No.: 12/482,149

(22) Filed: Jun. 10, 2009

(65) Prior Publication Data

US 2010/0318369 A1  Dec. 16, 2010

(51) Int. Cl.
*G06Q 10/10* (2012.01)
*G06Q 30/06* (2012.01)
*G06Q 30/04* (2012.01)

(52) U.S. Cl.
CPC .......... *G06Q 10/10* (2013.01); *G06Q 30/04* (2013.01); *G06Q 30/0633* (2013.01); *G06Q 30/0635* (2013.01); *G06Q 30/0637* (2013.01)

(58) Field of Classification Search
USPC ........................................ 705/1, 1.1, 26, 27
See application file for complete search history.

(56) References Cited

U.S. PATENT DOCUMENTS

| | | | |
|---|---|---|---|
| 7,039,604 B1 * | 5/2006 | Srinivasan et al. | 705/26.5 |
| 7,167,844 B1 * | 1/2007 | Leong et al. | 705/80 |
| 2002/0152133 A1 * | 10/2002 | King et al. | 705/26 |
| 2003/0023527 A1 * | 1/2003 | Wilce et al. | 705/35 |
| 2006/0010054 A1 * | 1/2006 | Gee | 705/35 |
| 2007/0192218 A1 * | 8/2007 | Licardi et al. | 705/30 |
| 2008/0312991 A1 * | 12/2008 | Bharadwaj et al. | 705/7 |
| 2009/0063287 A1 * | 3/2009 | Tribout et al. | 705/26 |
| 2009/0150804 A1 * | 6/2009 | Bokor et al. | 715/758 |
| 2009/0198561 A1 * | 8/2009 | Otto et al. | 705/10 |
| 2010/0211482 A1 * | 8/2010 | Nambiar et al. | 705/30 |

OTHER PUBLICATIONS http://www.magnetcommerce.com/ecommerce-software-guid/6-eCommerceShoppingCart-OrderManagement.shtml; "ECommerce Shopping Cart: Order Management"; Apr. 2, 2009.
http://web.mit.edu/sapr3/windocs/bpors05m.htm; "System Task: Change an Existing Purchase Order"; Apr. 2, 2009.
http://www.pgwebdevelopment.co.uk/section.php/3/1/ecommerce_management; "Ecommerce Management"; Apr. 2, 2009.
http://www.bussvc.wisc.edu/howto/purch/Change_Order.html; "How to Complete a Change Order for an Existing Purchase Order"; Apr. 2, 2009.

(Continued)

*Primary Examiner* — Gabrielle A McCormick
(74) *Attorney, Agent, or Firm* — Potomac Law Group, PLLC

(57) ABSTRACT

A document management system creates a copy of a first purchase document when a request to modify the first purchase document is received. The copy of the first purchase document is a second purchase document. The system receives modifications for the second purchase document. The system requests approval of the modifications of the second purchase document. The system receives approval of the modifications of the second purchase document. The system integrates the modifications of the second purchase document into the first purchase document. The first purchase document remains active at least after the second purchase document is created and before the receiving approval.

19 Claims, 9 Drawing Sheets

(56) References Cited

OTHER PUBLICATIONS http//it.toolbox.com/blogs/enterprise-solutions/document-change-control-policies-9162; "Document Change Control Policies"; Apr. 2, 2009.
http://help.sap.com/saphelp_crm40/helpdata//en/2e/23bfac82611d3b4f8006094b9b569/frameset.htm "Creating and Changing a Purchase Order"; Apr. 2, 2009.
http://support.netfirms.com/idx.php/4/636/-GETTING-STARTED-/article/Netfirms-Commerce-Pro-Setup.html; "Netfirms Commerce Pro Setup"; Apr. 2, 2009.
http://www.purchasing/psu.edu/forms/poch.pdf; "Purchase Order Change Form (POCH)"; Jul. 22, 2003.

\* cited by examiner

Fig. 9

DOCUMENT MANAGEMENT SYSTEM

FIELD

One embodiment is directed to a computer system for managing documents, and more particularly, to a computer system for managing purchase documents.

BACKGROUND

Generally, there can be many types of purchasing documents that businesses (purchasers) can use to transact with their respective vendors (suppliers). For example, a standard purchase order includes a specific product the purchaser desires and a delivery date of the specific product desired by the purchaser. Another type of purchasing document, a blanket agreement, may be a long term contract that indicates a particular product, a negotiated price for the particular product, and a particular duration for how long the product may be supplied to the purchaser. However, in the blanket agreement the purchaser may not indicate a delivery date of the product, because the purchaser may be unsure about when the product would be needed. With another type of document, a contract purchase agreement (e.g., a "specific" agreement), the purchaser does not know what product is needed, but simply indicates that a product is needed in, for example, the next year.

Once a purchase document is created and the supplier approves of the purchase document, the purchase document may be executed. For example, execution of a purchase agreement (i.e., a type of purchase document) occurs when a requester needs to create a requisition for a product specified in the purchase agreement. Execution of a purchase order (i.e., another type of purchase document) occurs when, for example, a product is received and the purchase order is used to validate against the invoice to pay the supplier. However, there may be instances where the purchaser and/or supplier wants to modify the purchase document (i.e., purchase agreement or purchase order). A reason to modify includes, for example, delivery date issues, change in product need, etc. Once the purchase document is modified, the modified purchase document requires re-approval by different parties associated with the purchase document. Upon approval of the modified purchase document, the purchase document can be executed again.

SUMMARY

One embodiment is a document management system. The system receives a request to modify a first purchase agreement. The system creates a copy of a first purchase document when a request to modify the first purchase document is received. The copy of the first purchase document is a second purchase document. The system receives modifications for the second purchase document. The system requests approval of the modifications of the second purchase document. The system receives approval of the modifications of the second purchase document. The system integrates the modifications of the second purchase document into the first purchase document. The first purchase document remains active at least after the second purchase document is created and before the receiving approval.

BRIEF DESCRIPTION OF THE DRAWINGS

In order for the embodiments of the invention to be readily understood, a more particular description of the invention briefly described above will be rendered by reference to specific embodiments that are illustrated in the appended drawings. While it should be understood that these drawings illustrate only typical embodiments of the invention and are not therefore to be considered to be limiting of its scope, the invention will be described and explained with additional specificity and detail through the use of the accompanying drawings, in which:

FIG. 9 illustrates a purchase agreement user interfaces in accordance with one embodiment of the invention that allows the user to view the purchase agreement selected from user interface of FIG. 8.

DETAILED DESCRIPTION

One embodiment is a document management system that modifies purchase documents. The document management system creates a copy of the purchase document while maintaining the purchase document in an active state. The active state allows the original purchase document to be executed at any point while modifications are made to the copy of the purchase document and while awaiting for approval of the modified purchase document. The active state allows the original purchase document to be compared against invoices of the supplier or allows the purchase document to be used for other accounting related purposes while awaiting change approval.

Figure 1:
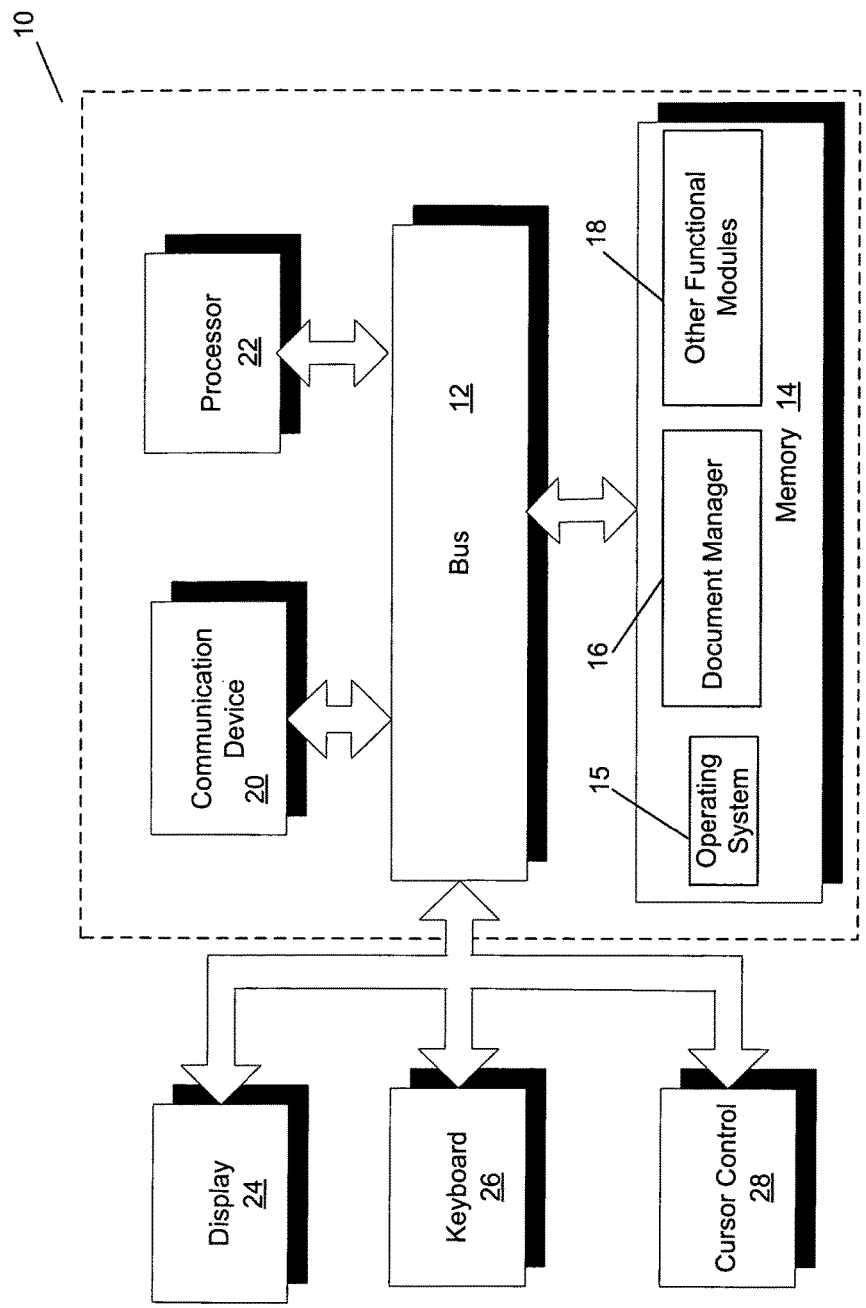
FIG. 1 is a block diagram of a document management system that can be implemented in one embodiment of the invention.

FIG. 1 is a block diagram of a document management system 10 that can be implemented in one embodiment of the invention. System 10 may include a bus 12 or other communication mechanism that can communicate information and a processor 22, coupled to bus 12, that can process information. Processor 22 can be any type of general or specific purpose processor. System 10 may also include a memory 14 that can store information and instructions to be executed by processor 22. Memory 14 can be comprised of any combination of random access memory ("RAM"), read only memory ("ROM"), static storage such as a magnetic or optical disk, or any other type of computer readable media. System 10 may also include a communication device 20, such as a network interface card, that may provide access to a network. As a result, a user may interface with system 10 directly, or remotely through a network or any other method.

Computer readable media may be any available media that can be accessed by processor 22. Computer readable media may include both volatile and nonvolatile medium, removable and non-removable media, and communication media. Communication media may include computer readable instructions, data structures, program modules or other data in a modulated data signal such as a carrier wave or other transport mechanism and may include any information delivery media.

Processor 22 can also be coupled via bus 12 to a display 24, such as a Liquid Crystal Display ("LCD"). Display 24 may display information to the user, such as purchaser agreement information. A keyboard 26 and a cursor control unit 28, such as a computer mouse, may also be coupled to bus 12 to enable the user to interface with system 10.

According to one embodiment, memory 14 may store software modules that may provide functionality when executed by processor 22. The modules can include an operating system 15, a document manager 16, as well as other functional modules 18. System 15 may provide an operating system functionality for system 10. Document manager 16 may create a change order request (e.g., a request for change) for approval, as described in more detail below. Because system 10 may be part of a larger system, system 10 may include one or more additional functional modules 18 to include the additional functionally. For example, functional modules 18 may include financial/accounting modules that are part of Oracle Fusion Purchasing.

Figure 2:
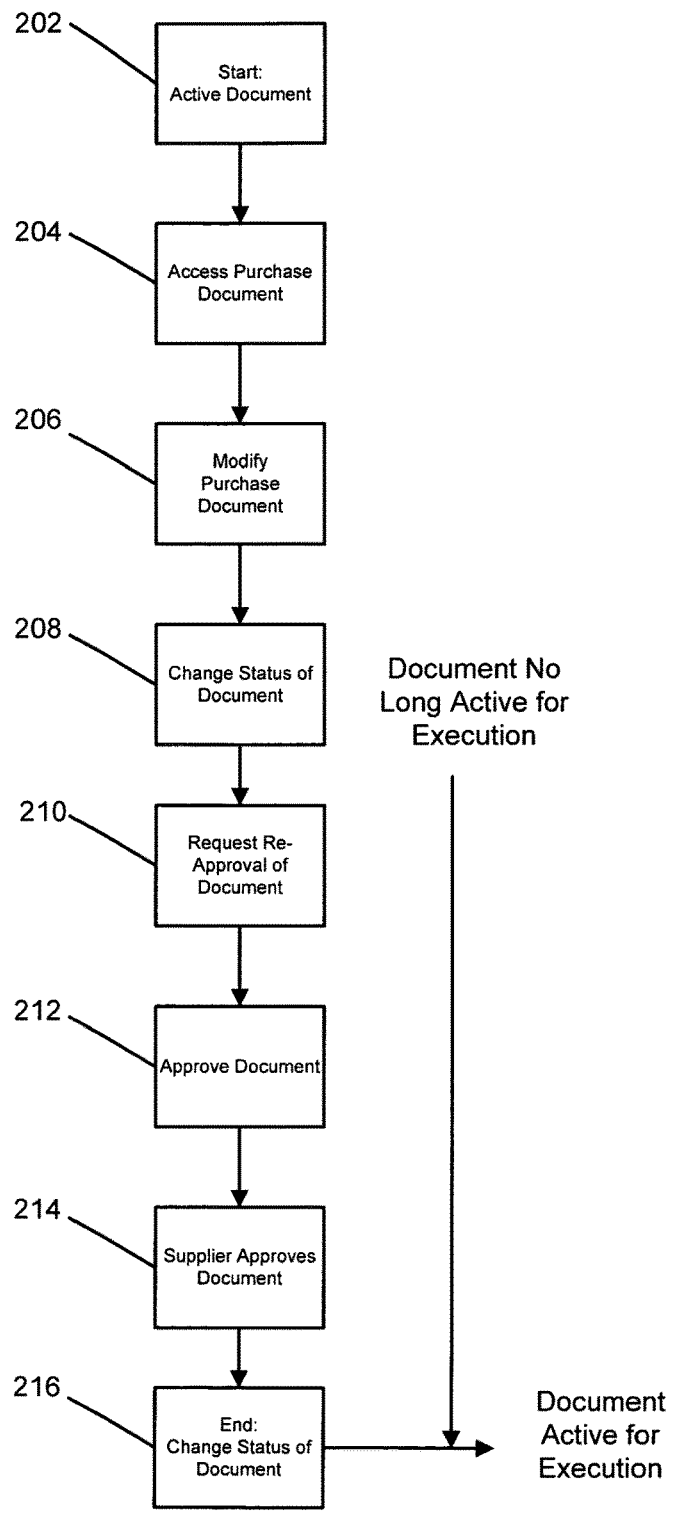
FIG. 2 is prior art of a flow diagram of a contract management system.

FIG. 2 is a prior art flow diagram of a typical document modification system. Generally, once a purchaser and supplier agree to contents of the purchase document, the purchase document becomes an active document or has an active status at 202. The active document or active status indicates that the purchase document is ready for execution. For example, the active status indicates that the purchase document is available to validate any invoice received from the supplier.

As discussed above, there may be many reasons why a purchaser, supplier, or any other entity connected to the purchase document may want to change the contents of the purchase document. In those instances, a user accesses the purchase document in order to make the changes to the purchase document at 204. For example, the user accesses the purchase document by performing a search for the purchase document in a database. Once the purchase document is found, the purchase document is selected and the contents of the purchase document is viewed.

The purchase document can be modified at 206 by making changes to, for example, price, product type, quantity of product, vendor information, buyer information, delivery address, etc. Once modifications are complete, the purchase document, as modified, is submitted for approval by the relevant entities. However, the modified purchase document is no longer be available for execution, because the status of the purchase document is changed from active to a re-approval status (e.g., requires re-approval) at 208. The re-approval status indicates that the purchase document was modified by an entity (e.g., purchasing organization and/or supplying organization). Furthermore, the re-approval status also indicates that the modified purchase document may not be executed until the modified purchase document is approved.

Because the purchase document has been modified at 206, re-approval of the purchase document is required by a party of the purchasing organization (e.g., purchaser) and/or a party of the supplying organization (e.g., supplier). For example, the purchaser and seller are requested to approve the modified purchase document at 210. The time period for re-approval of the modified purchase document can be days or months. For example, in cases where the terms and conditions of the purchase document are requested to be modified, the time period may be days or months, because approval of such sections of the purchase document may need additional parties to be involved for review. This may be inefficient and may cause disruption in execution of the purchase document. For example, because the modified purchase document is the same document as the original purchase document, the edited purchase document cannot be processed (e.g., executed) until the modified purchase document is approved by, for example, the supplier. In other words, because the contents of the original purchase document was replaced with modifications, the purchase document, as modified, cannot be used for execution until the modified purchase document is approved by respective parties.

For example, when a purchase agreement is modified, the purchase agreement cannot be executed. In other words, a purchase order cannot be created when the purchase agreement is modified, because the creation of the purchase order is based on terms and conditions of the purchase agreement. For example, a requisition (e.g., a request) cannot be created because a blanket purchase agreement is being modified. The requisition of a product cannot be made because the requestor (e.g., a party of the purchaser) is unable to search the database for the blanket purchase agreement. The requestor is unable to search the database for the blanket purchase agreement because the blanket purchase agreement is not visible to the requester, as the blanket purchase agreement is being modified. This may cause the requester in buying a product from a different supplier with whom a price may not be negotiated for the product. This results in the product to be more expensive, because the purchase agreement was not visible to the requester due to modifications to the purchase agreement.

When, for example, a purchase order is modified, execution of the purchase order can be disrupted. For example, if the purchase order is modified, a party of the purchasing organization cannot receive the product. In other words, when the requestor and/or receiver of the purchasing organization, who receives the product, goes to the system, the requestor will not be able to access and/or view the purchase order because the purchase order is being modified. This may cause, for example, the receiver to return the product or call the requestor regarding the product, thereby causing delays in the execution of the purchase order.

Also, there are instances when the purchase order indicates that the product is to be delivered at location A and an invoice is to be sent to location B. When for example, the purchase order is modified, execution of the purchase order can be disrupted. For example, when an accounting department of the purchasing organization attempts to validate the invoice against the purchase order, the validation will fail, because the purchase order that is modified will not appear in the database, as the purchase order is set to the re-approval status.

Once the user approves the modified purchase document at 212, the modified purchase document is transmitted to the supplier for acceptance of the modified purchase document. The supplier accepts the modified purchase document at 214 and transmits the modified purchase document back to the contract management system. The status of the purchase document is changed from the re-approval status to active status (revised active document) at 216, thereby finally making the purchase document available for execution. Such a system is highly inefficient because there can be lengthy delays in the execution of the purchase document.

Figure 3:
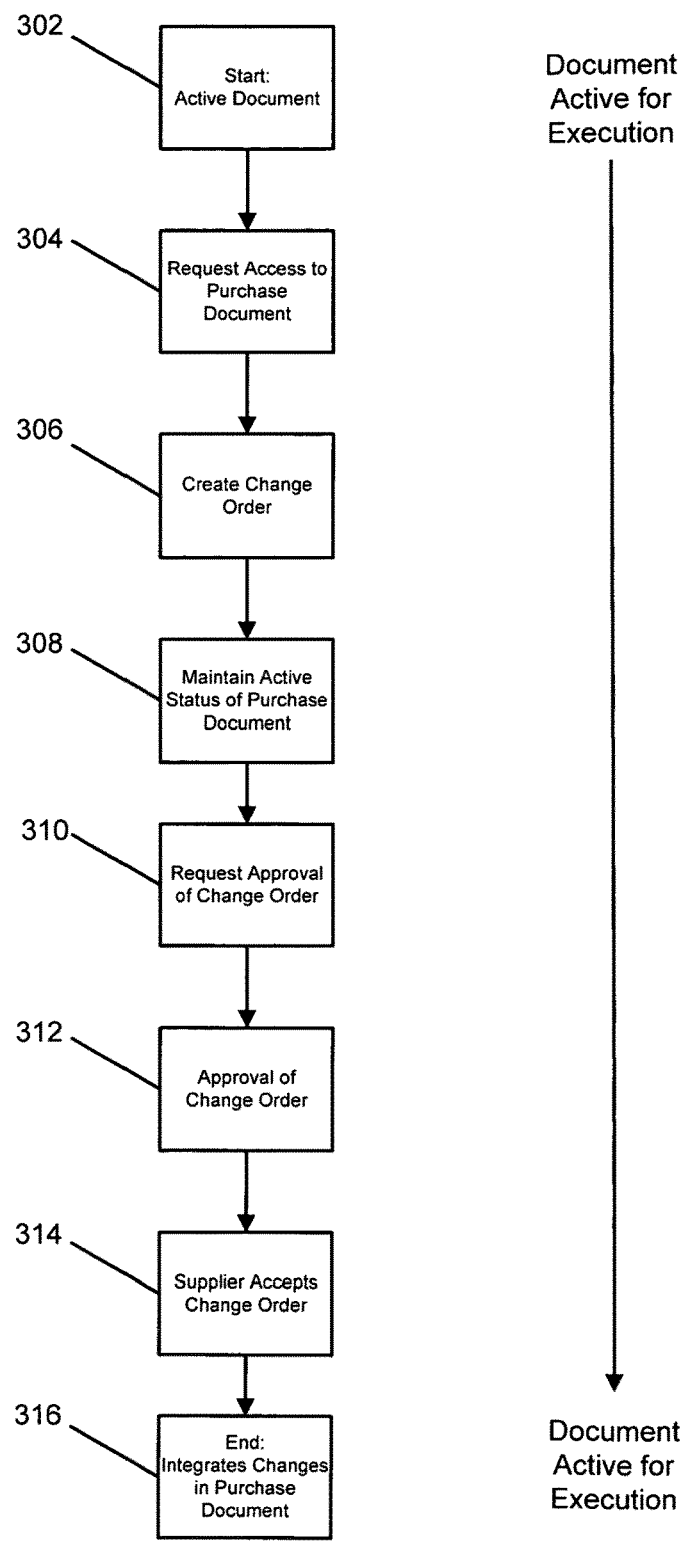
FIG. 3 is a flow diagram of a document manager in accordance with one embodiment of the invention.

FIG. 3 is a flow diagram of document manager 16 in accordance with one embodiment of the invention. In one embodiment, the functionality of the flow diagram of FIG. 3 is implemented by software stored in memory or other computer readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware or software.

Initially, a purchaser submits a purchase document to document manager 16 so the purchase document may be approved by the supplier. When document manager 16 receives an approval of the purchase document from the supplier, the status of the purchase document may be indicated as active at 302 and available for execution.

However, there may be many reasons for a requestor of a purchasing organization or a party of a supplying organization (e.g., supplier), for example, to modify the purchase document. For example, a purchase order (e.g., a type of purchase document) can be modified for at least one of the following: the requestor wants to add, remove, or modify an item in the purchase order, or the supplier wants to change a delivery date of the purchase order, because the supplier cannot deliver the item on the delivery date.

A purchase agreement (e.g., a type of purchase document) can, for example, be modified, because of at least one of the following reasons: the purchasing organization wants to modify contract terms and conditions on an agreement to mitigate risk that may be caused because of new governmental laws and/or regulations, supplier wants to add more lines on the purchase agreement so that they can supply a product to the purchasing organization, and supplying organization wants to increase the price of goods and/or services on the purchase agreement because of inflation.

When document manager 16 receives a request to access the purchase document from the purchaser at 304 in order for the purchaser to make a change to the purchase document, document manager 16 provides the purchaser the option to perform a search in a database for the purchase document. Document manager 16 receives criteria from the purchaser in order to perform the search. Document manager 16 produces search results. The search results provide a list of relevant purchase document. Document manager 16 receives a selection from the purchaser as to which purchase document is to be edited/modified. Document manager 16 creates a "change order" at 306 by importing contents of the purchase document to be modified into the change order. For example, the change order is an object that inherits data, attributes, entities from the purchase document on which the change order is created. The process copies data from the purchase document to create the change order. The change order is used to provide new values for attributes, such as price, item description, etc.

The change order allows the purchaser to make any changes to the purchase document, while keeping the original purchase document unchanged until changes in the change order are approved. Document manager 16 maintains the status of the purchase document as active at 308, because the purchase document (itself) cannot be modified directly after the initial version of the purchase document is approved internally and accepted by the supplier. Instead, the change order (i.e., a copy of the purchase document) is modified by the purchaser. This prevents the integrity of the purchase document from being compromised. For example, the original purchase document can be validated against products and invoice received from the supplier while waiting for approval.

Furthermore, because document manager 16 keeps the purchase document as active, the purchase document can be executed. For example, the purchase document can be used to track and receive products as well as match invoices from the supplier against the purchase document. Stated another way, document manager 16 may maintain the same copy of the purchase document until the changes made in the change order form are approved and, once approved, the changes are integrated (e.g., implemented) into the purchase document. This results in the purchase document to be available for execution at any time during pendency of the approval of the change order form (e.g., modified purchase document).

Changes in the change order form can be received by document manager 16. However, document manager 16 can require the change order form to be approved at 310. For example, document manager 16 requests a manager of the requestor of the purchasing organization (e.g., purchaser) to approve the changes in the change order form. As discussed above, the status of the purchase document continues to be active, because the purchase document has not have been modified. As a result, the purchase document remains available for execution (i.e., permits tracking/receiving product and/or matching invoice from supplier).

When document manager 16 receives approval at 312 from the purchaser (e.g., the manager of the requestor of the purchasing organization), document manager 16 transmits a request to the supplier for acceptance of the change order form. When the supplier accepts the changes requested as part of the change order at 314, the supplier transmits the acceptance to document manager 16. Document manager 16 integrates (e.g., implements) at 316 the approved/accepted changes in the change order form into the purchase document that is currently executed. In one embodiment, document manager 16 replaces the contents of the purchase document with the approved changes in the change order form. In another embodiment, document manager 16 replaces the original purchase document with the approved changed order form. This will result in the revised document continuing to be active in accordance with one embodiment. In one embodiment, at no point is the purchase document set to an inactive, a re-approval, or modified status, because the contents of the original purchase document cannot be changed until the contents of the change order form are accepted.

Figure 4:
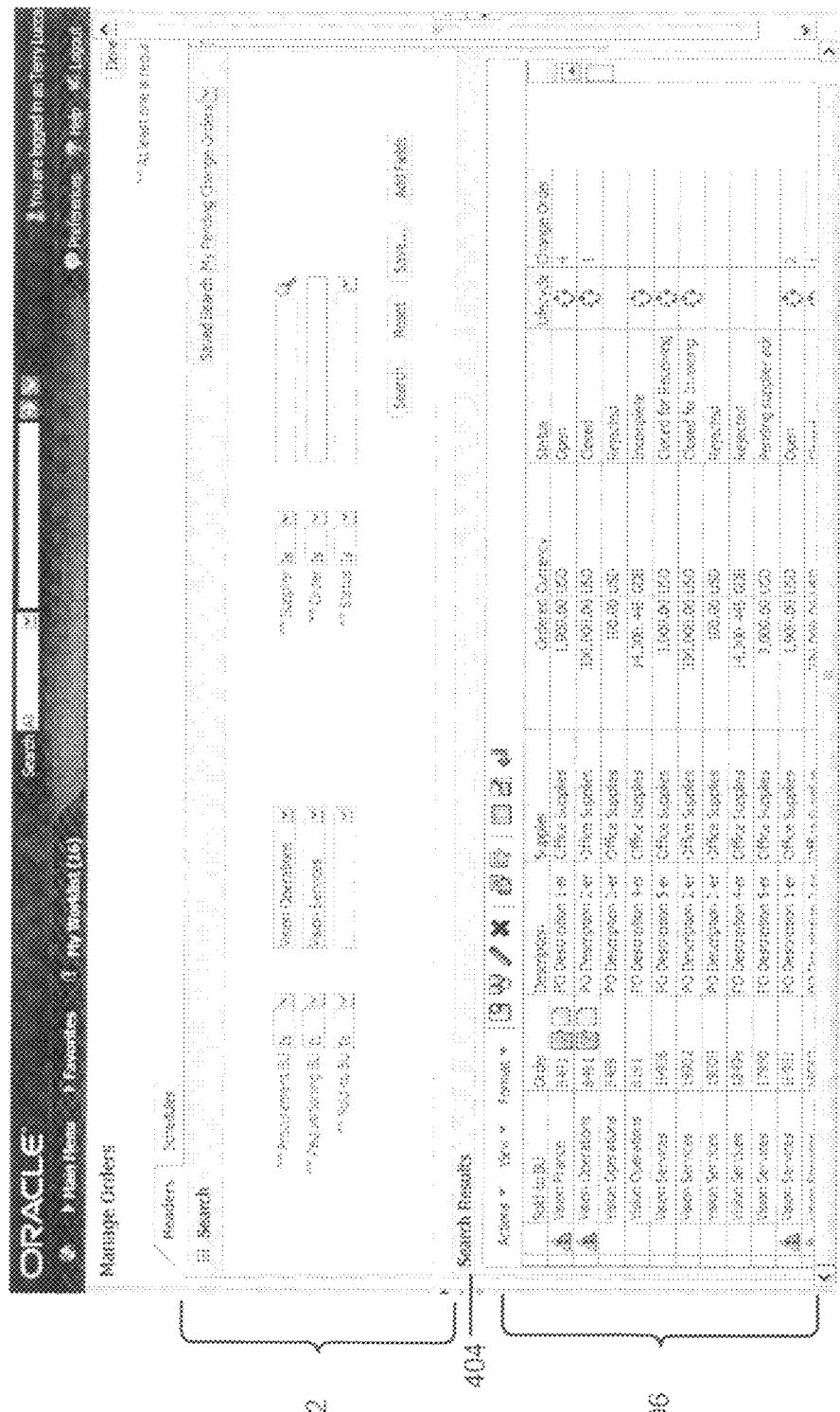
FIG. 4 illustrates a manage orders user interface in accordance with one embodiment of the invention that allows a user to view purchase order and initiate a change order form against the purchase order.

FIG. 4 illustrates a manage orders user interface 400 in accordance with one embodiment of the invention that allows a user to view the purchase order and initiate a change order form against the purchase order. Specifically, user interface 400 allows the user to search in section 402 for a specific order (e.g., purchase order) that the user wants to modify. For example, the search criteria includes procurement business unit ("BU"), requisitioning BU, sold to BU, supplier, order, status, etc. User interface 400 displays, via display 24, search results in section 404 based on the search criteria provided by the user. Based on the search result, user interface 400 provides the user an option to select, for example, a particular row in section 406. By selecting a particular row, user interface 400 allows the user to view the purchase document of the corresponding row.

Figure 5:
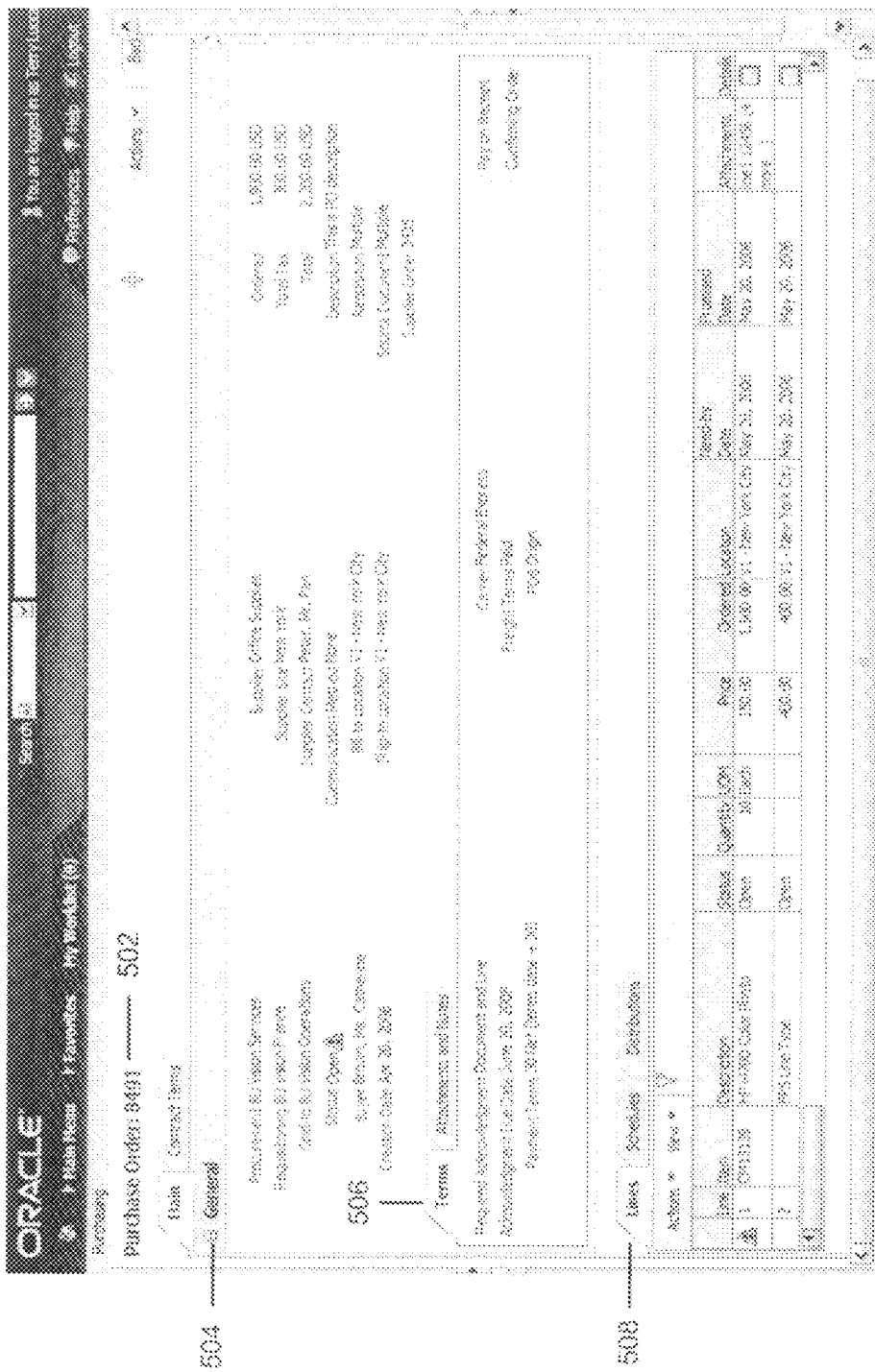
FIG. 5 illustrates a view order user interface in accordance with one embodiment of the invention that allows the user view the purchase order selected from the user interface of FIG. 4.

FIG. 5 illustrates a view order user interface 500 in accordance with one embodiment of the invention that allows the user view the purchase order selected from user interface 400. For example, user interface 500 displays the purchase order number in section 502, general information about the purchase order in section 504, terms of the purchase order in section 506, lines (line items) in section 508. For example, general information in section 504 includes buyer name and information, seller name and information, delivery information, status, supply amount, total cost (order cost plus tax cost). General information in section 504 also includes terms of the purchase order in section 506. Lines in section 508 includes the item being purchased, a description of the item, quantity of the item, price, cost of order, delivery location, delivery date, payment date, attachment information, and additional details.

Figure 6:
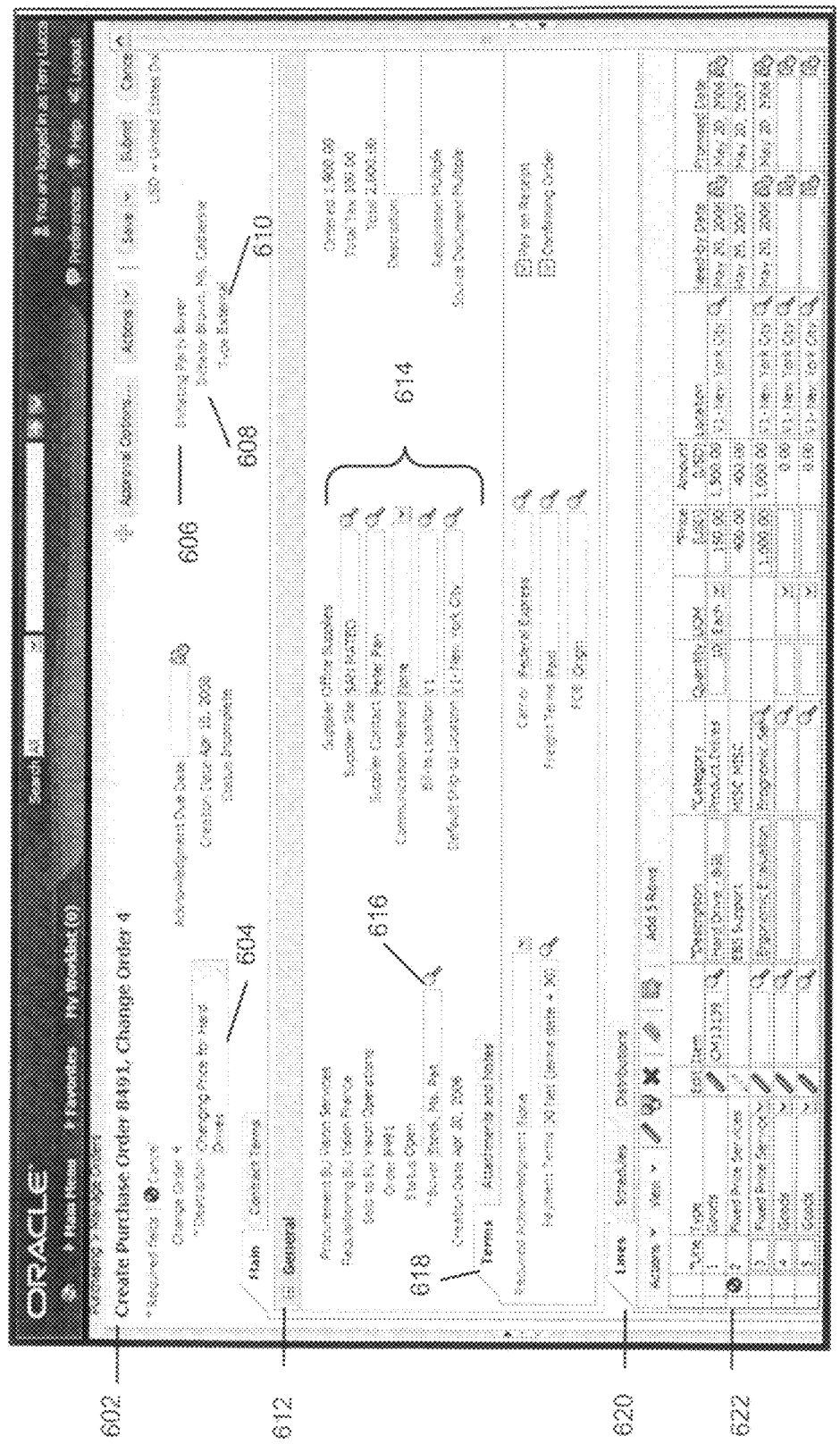
FIG. 6 illustrates a change order user interface in accordance with one embodiment of the invention that allows a user to make proposed changes.

FIG. 6 illustrates a change order user interface 600 in accordance with one embodiment of the invention that allows a user to make proposed changes. For example, user interface 600 includes a change order number in section 602 and a description in section 604 of the change order. Description in section 604 describes what is being changed in the change order. User interface 600 may also include what party, for example, purchaser or supplier, initiates the changes in section 606. User interface 600 may also include a name in section 608 of the initiating party.

User interface 600 includes general information in section 612 that may need to be changed. For example, user interface 600, as illustrated in FIG. 6, may be modified to change contact information in section 614 of the supplier. User interface 600, as illustrated in FIG. 6, may also be modified to change information pertaining to the purchaser (e.g., buyer). For example, the buyer name can be changed from Ms. Catherine Brown to Ms. Pat Stock in section 616.

User interface 600 includes terms in section 618 that may need to be changed. For example, payment terms, carrier, freight terms, etc., may be changed. User interface 600 also allows lines (line items) in section 620 to be modified. For example, user interface 600 allows an item to be cancelled in section 612. User interface 600 also allows item number, description, quality, price, location, expected date, and promised date, etc., to be modified.

Figure 7:
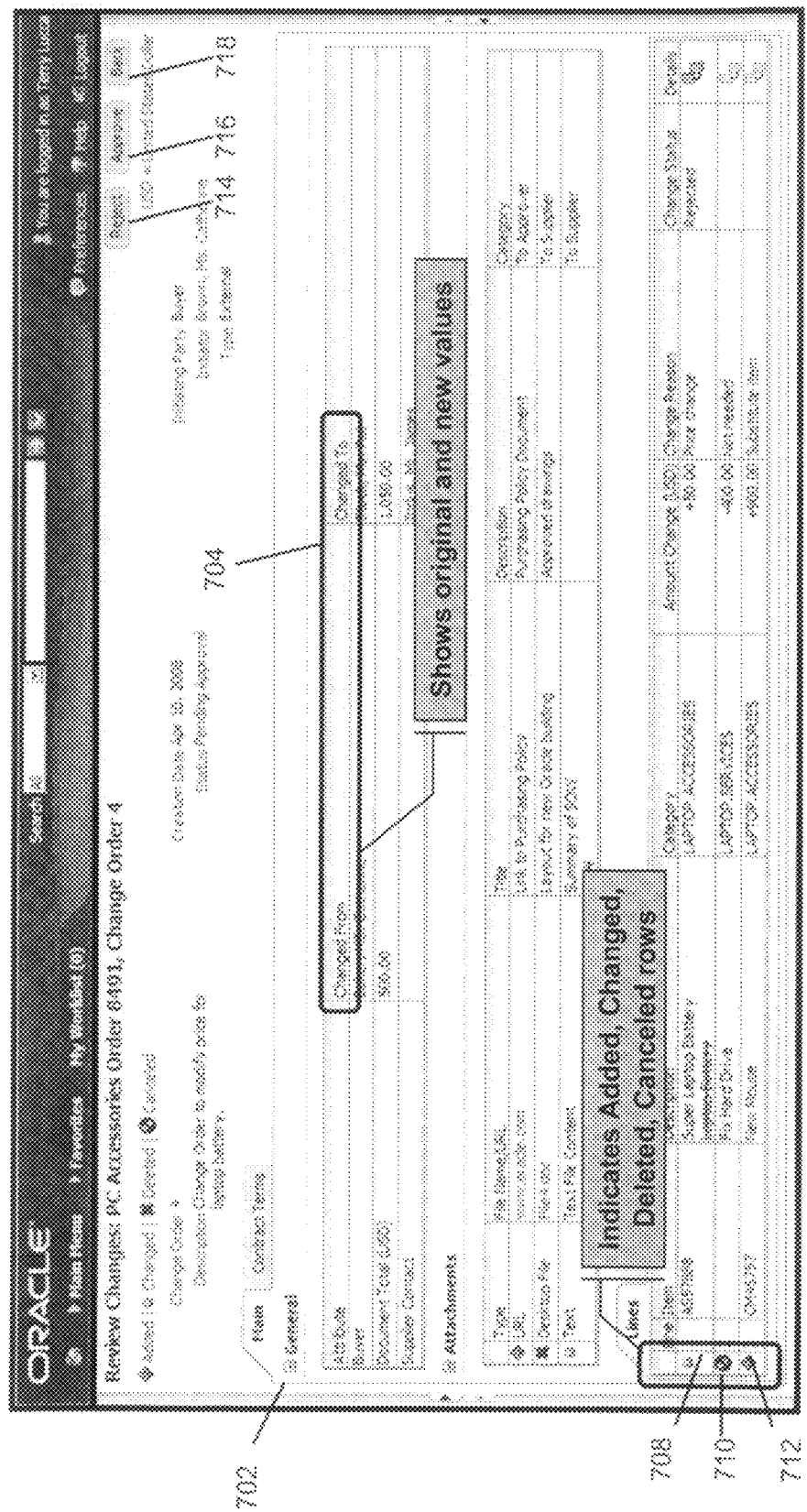
FIG. 7 illustrates a review change order user interface in accordance with one embodiment of the invention to enable a user to view all attributes that are being modified as part of a change order, as well as their original and new values.

FIG. 7 illustrates a review change order user interface 700 in accordance with one embodiment of the invention to enable a user to view all attributes that are being modified as part of a change order, as well as their original and new values. User interface 700 permits a user to review all changes prior to submitting the changes for approval. User interface 700, as illustrated in FIG. 7, may list attribute(s) in section 702 that needs to be changed. For example, an attribute may indicate that the buyer information is being change. User interface 700 lists the original information and the new information in section 704 of the corresponding attribute that needs to be changed. For example, the changed from indicates the buyer's original name. The changed to indicates the buyer's new name.

User interface 700 also indicates whether any attachments were added, deleted, or changed. In addition, user interface 700 indicates whether any of the lines (line items) were added, changed, deleted or cancelled. For example, user interface 700 illustrated in FIG. 7 indicates in row 708 that the description of the product is changed from "laptop battery" to "super laptop battery." User interface 700 also indicates in row 710 that "fix hard drive" was deleted and in row 712 that a "new mouse" was added.

Figure 8:
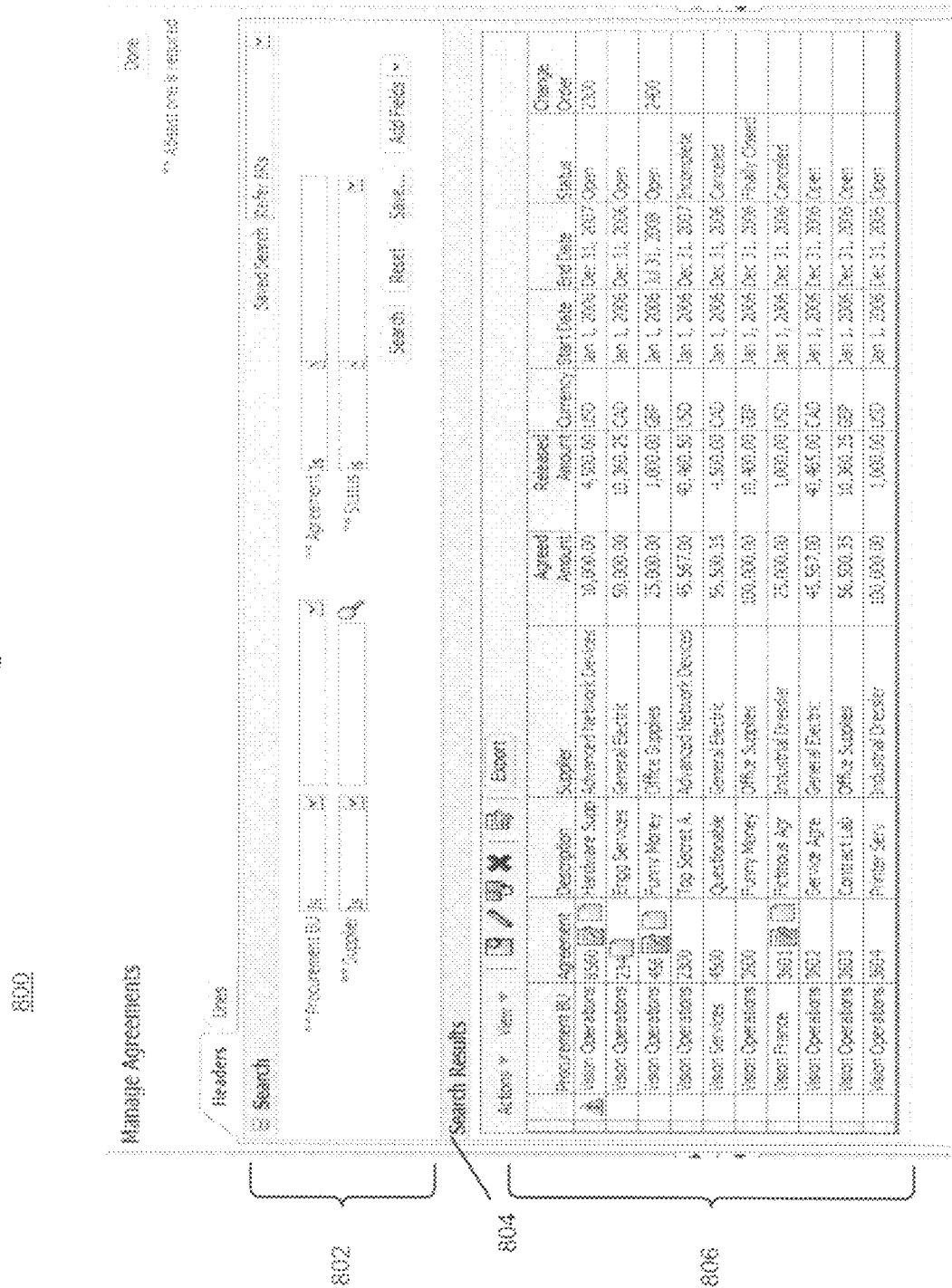
FIG. 8 illustrates a manage agreements user interface in accordance with one embodiment of the invention that allows a user to search and view purchase agreements.

FIG. 8 illustrates a manage agreements user interface 800 in accordance with one embodiment of the invention that allows a user to search and view purchase agreements. Specifically, user interface 800 allows the user to search in section 802 for specific agreements (e.g., purchase agreements) that the user may want to modify. For example, the search criteria includes procurement business unit ("BU"), supplier, agreement, status, etc. User interface 800 displays, via display 24, search results in section 804 based on the search criteria provided by the user. Based on the search result, user interface 800 provides the user an option to select a particular row in section 806. By selecting a particular row, user interface 800 allows the user to view the purchase agreement of the corresponding row.

Figure 9:
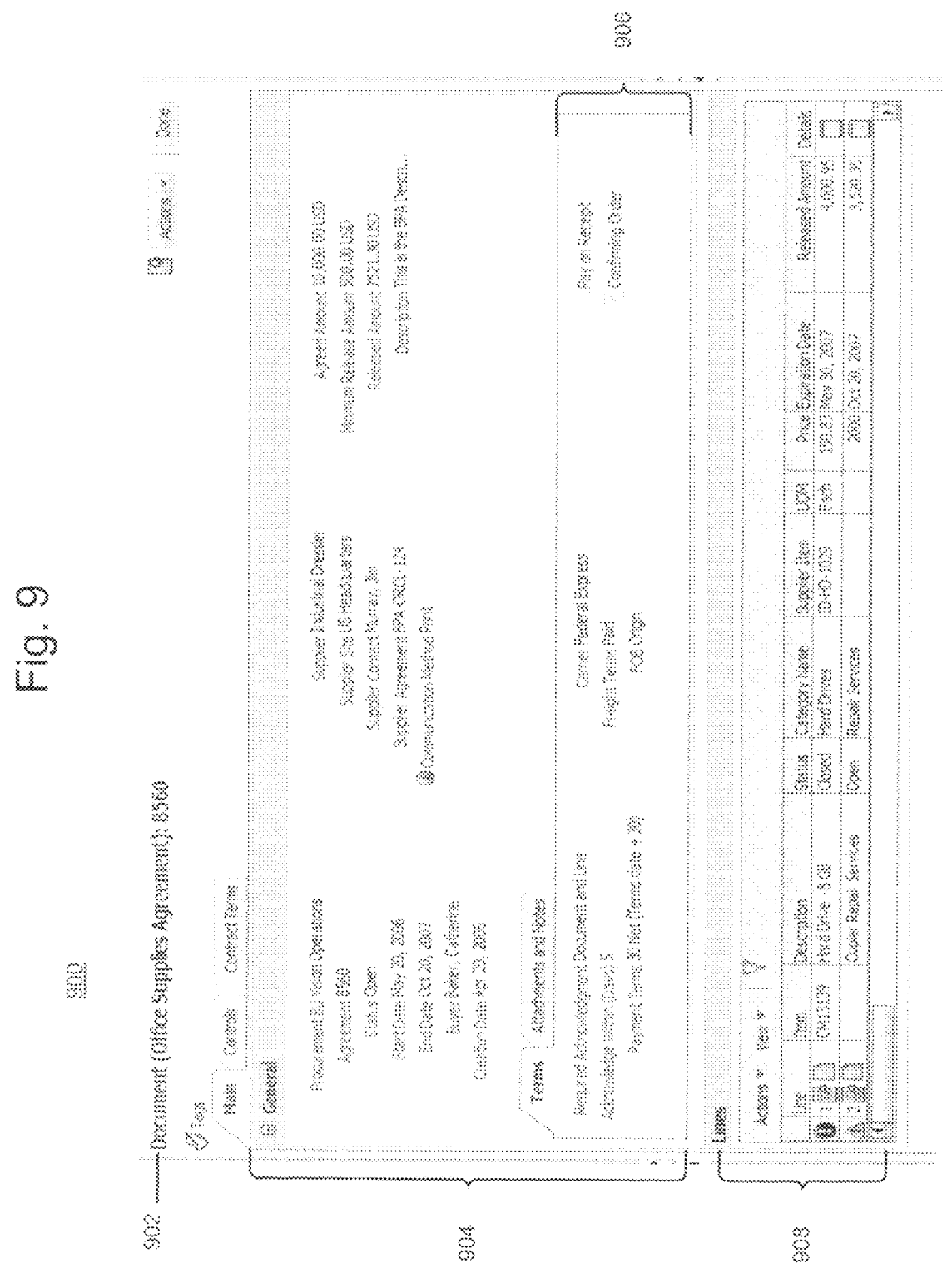

FIG. 9 illustrates a purchase agreement user interface 900 in accordance with one embodiment of the invention that allows the user to view the purchase agreement selected from user interface of FIG. 8. For example, user interface 900 displays purchase agreement in section 902, general information about the purchase agreement in section 904, terms of the purchase agreement in section 906, lines in section 908. For example, general information in section 904 includes buyer name and information, supplier name and information, purchase agreement description, purchase amount information. Terms in section 906 includes terms of the purchase agreement and lines in section 908 includes items being purchase, a description of the item, status, category name, supplier item, price, expiration date, released amount, etc. User interface 900 allows a user to modify the purchase agreement, create a purchase order based on the terms of the purchase agreement, etc.

As discussed, an embodiment is a document manager that creates a change order form when a party requests that the purchase document be modified and maintains the original purchase document as being active. The change order form allows the party to makes changes and submit the change order form for approval. Upon approval of the change order form, the document manager incorporates the changes made in the change order form into the original purchase document. As a result, the original purchase document will be not changed and will continue to be the primary purchase document for accounting purchases until all parties have agreed to the changes.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

What is claimed is:

1. A non-transitory computer readable medium having instructions stored thereon that, when executed by a processor, cause the processor to manage purchase documents, the managing comprising:
receiving a request to modify an approved first purchase document having an active status;
generating a second purchase document that is a change order object by importing, from a database, contents of the approved first purchase document, the second purchase document inheriting data, attributes, and entities from the approved first purchase document;
displaying the contents imported into the second purchase document in a graphical user interface, wherein at least a portion of the displayed contents is editable by a user;

receiving, using the graphical user interface, modifications to the second purchase document, the modifications including a new value for at least one attribute;

displaying the original value of the one attribute prior to the modification and the new value for the one attribute in the graphical user interface;

transmitting, over a network, a request to approve the modified second purchase document to a supplier, wherein the approved first purchase document has an active status and the second purchase document does not have an active status while the approval request is pending;

receiving, over the network, an invoice from the supplier;

while the approval request is pending, validating and tracking the invoice received from the supplier using the approved first purchase document based on the status of the first purchase document being active and the approval request being pending;

receiving, over the network, approval of the modified second purchase document from the supplier;

upon receiving the approval, implementing the approved modifications to the second purchase document to generate an approved second purchase document by replacing corresponding contents of the first purchase document with the approved modifications to the second purchase document, or replacing the first purchase document with the modified second purchase document, wherein the approved second purchase document is switched to active status and the approved first purchase document is switched to inactive status, and one of the approved first purchase document or the approved second purchase document is active at a given time such that an invoice that is received at a point in time is validated based on the active one of these purchase documents at the point in time.

2. The computer readable medium of claim 1, further comprising validating a product received from a supplier using the approved first purchase document.

3. The computer readable medium of claim 1, further comprising tracking a shipment of a product using the approved first purchase document.

4. The computer readable medium of claim 1, wherein the modifications of the second purchase document includes modifications to at least one of: buyer information, supplier information, product information, or delivery date information.

5. The computer readable medium of claim 1, wherein the approved first purchase document is executed by a first entity and a second entity.

6. The computer readable medium of claim 5, wherein when the modifications of the second purchase document is by the first entity, approval of the modifications of the second purchase document is requested from an approving entity of the first entity.

7. The computer readable medium of claim 5, wherein when the modifications of the second purchase document is by the first entity, acceptance of the modifications of the second purchase document is requested from the second entity.

8. The computer readable medium of claim 1, wherein the managing further comprises: displaying in the user interface a plurality of modifications to the contents imported into the second purchase document.

9. The computer readable medium of claim 8, wherein the plurality of modifications are displayed as changes that show deletions to the contents imported and additions of the modifications.

10. The computer readable medium of claim 9, wherein the shown deletions are indicted by strikethroughs and the shown additions are indicated by underlining.

11. A computer implemented method, comprising:

receiving a request to modify an approved first purchase document having an active status;

generating a second purchase document that is a change order object by importing, from a database, contents of the approved first purchase document, the second purchase document inheriting data, attributes, and entities from the approved first purchase document;

displaying the contents imported into the second purchase document in a graphical user interface, wherein at least a portion of the displayed contents is editable by a user;

receiving, using the graphical user interface, modifications to the second purchase document, the modifications including a new value for at least one attribute;

displaying the original value of the one attribute prior to the modification and the new value for the one attribute in the graphical user interface;

transmitting, over a network, a request to approve the modified second purchase document to a supplier, wherein the approved first purchase document has an active status and the second purchase document does not have an active status while the approval request is pending;

receiving, over the network, an invoice from the supplier;

while the approval request is pending, validating and tracking the invoice received from the supplier using the approved first purchase document based on the status of the first purchase document being active and the approval request being pending;

receiving, over the network, approval of the modified second purchase document from the supplier;

upon receiving the approval, implementing the approved modifications to the second purchase document to generate an approved second purchase document by replacing corresponding contents of the approved first purchase document with the approved modifications to the second purchase document, or replacing the approved first purchase document with the approved second purchase document, wherein the approved second purchase document is switched to active status and the approved first purchase document is switched to inactive status, and one of the approved first purchase document or the approved second purchase document is active at a given time such that an invoice that is received at a point in time is validated based on the active one of these purchase documents at the point in time.

12. The computer implemented method of claim 11, further comprising validating a product, or tracking shipment of a product, using the approved first purchase document.

13. The method of claim 11, wherein the approved first purchase document is executed by a first entity and a second entity, and, when the modifications of the second purchase document are received from the first entity, approval of the modifications of the second purchase document is requested from the second entity.

14. The method of claim 11, wherein the modifications of the second purchase document includes modifications to at least one of: buyer information, supplier information, product information, or delivery date information.

15. The method of claim 11, wherein the approved first purchase document is executed by a first entity and a second entity, and when the modifications of the second purchase document is by the first entity, approval of the modifications of the second purchase document is requested from an approving entity of the first entity.

16. The method of claim 11, wherein the approved first purchase document can be executed by a first entity and a second entity, and when the modifications of the second purchase document is by the first entity, approval of the modifications of the second purchase document is requested from the second entity.

17. The method of claim 11, further comprising: displaying in the user interface a plurality of modifications to the contents imported into the second purchase document.

18. The computer readable medium of claim 17, wherein the plurality of modifications are displayed as changes that show deletions to the contents imported and additions of the modifications.

19. The computer readable medium of claim 18, wherein the shown deletions are indicted by strikethroughs and the shown additions are indicated by underlining.

* * * * *

UNITED STATES PATENT AND TRADEMARK OFFICE
CERTIFICATE OF CORRECTION

PATENT NO. : 10,304,035 B2
APPLICATION NO. : 12/482149
DATED : May 28, 2019
INVENTOR(S) : Nambiar et al.

Page 1 of 1

It is certified that error appears in the above-identified patent and that said Letters Patent is hereby corrected as shown below:

In the Claims

In Column 10, Line 6, in Claim 10, delete "indicted" and insert -- indicated --, therefor.

In Column 11, Line 18, in Claim 18, delete "computer readable medium" and insert -- method --, therefor.

In Column 11, Line 22, in Claim 19, delete "computer readable medium" and insert -- method --, therefor.

In Column 11, Line 25, in Claim 19, delete "indicted" and insert -- indicated --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*